(12) United States Patent
Krauss et al.

(10) Patent No.: US 10,581,914 B2
(45) Date of Patent: Mar. 3, 2020

(54) METHOD AND SYSTEM OF MITIGATING NETWORK ATTACKS

(71) Applicant: Ciena Corporation, Hanover, MD (US)

(72) Inventors: David Jordan Krauss, Centreville, VA (US); Loudon Blair, Sykesville, MD (US)

(73) Assignee: Ciena Corporation, Hanover, MD (US)

( * ) Notice: Subject to any disclaimer, the term of this patent is extended or adjusted under 35 U.S.C. 154(b) by 125 days.

(21) Appl. No.: 15/173,434

(22) Filed: Jun. 3, 2016

(65) Prior Publication Data

US 2017/0353490 A1 Dec. 7, 2017

(51) Int. Cl.
*H04L 29/06* (2006.01)

(52) U.S. Cl.
CPC ...... *H04L 63/1491* (2013.01); *H04L 63/1416* (2013.01); *H04L 63/1425* (2013.01)

(58) Field of Classification Search
CPC .................................................. H04L 63/1491
USPC ......................................................... 726/23
See application file for complete search history.

(56) References Cited

U.S. PATENT DOCUMENTS

| | | | | |
|---|---|---|---|---|
| 9,152,808 B1* | 10/2015 | Ramalingam | ........... | G06F 21/62 |
| 9,602,536 B1* | 3/2017 | Brown, Jr. | .......... | H04L 63/1491 |
| 2002/0059078 A1* | 5/2002 | Valdes | ................ | H04L 41/0631 705/1.1 |
| 2004/0172557 A1* | 9/2004 | Nakae | ................. | H04L 63/0227 726/22 |
| 2004/0213229 A1* | 10/2004 | Chang | ................. | H04J 14/0227 370/390 |
| 2006/0101515 A1* | 5/2006 | Amoroso | .......... | H04L 29/12009 726/23 |
| 2006/0259967 A1* | 11/2006 | Thomas | ................ | H04L 63/145 726/22 |
| 2007/0258437 A1* | 11/2007 | Bennett | ............... | H04L 63/1441 370/352 |
| 2007/0261112 A1* | 11/2007 | Todd | ..................... | G06F 21/577 726/11 |
| 2012/0254951 A1* | 10/2012 | Munetoh | ............... | G06F 21/554 726/4 |
| 2013/0305369 A1* | 11/2013 | Karta | .................. | H04L 63/1416 726/23 |
| 2014/0096229 A1* | 4/2014 | Burns | ................. | H04L 63/1491 726/15 |
| 2017/0034193 A1* | 2/2017 | Schulman | ........... | H04L 63/1416 |
| 2017/0134405 A1* | 5/2017 | Ahmadzadeh | ...... | H04L 63/1416 |

* cited by examiner

*Primary Examiner* — Peter C Shaw
(74) *Attorney, Agent, or Firm* — Clements Bernard Walker; Christopher L. Bernard; Lawrence A. Baratta, Jr.

(57) ABSTRACT

A method for mitigating network attacks includes receiving traffic status information from sentries distributed in a network, and analyzing the traffic status information to detect an attack on the network. In response to the attack, an isolated network slice is created. For the isolated network slice, a deceptive network resource is created in isolated network slice. The method further includes transmitting instructions to route malicious traffic to the deceptive network resource.

20 Claims, 9 Drawing Sheets

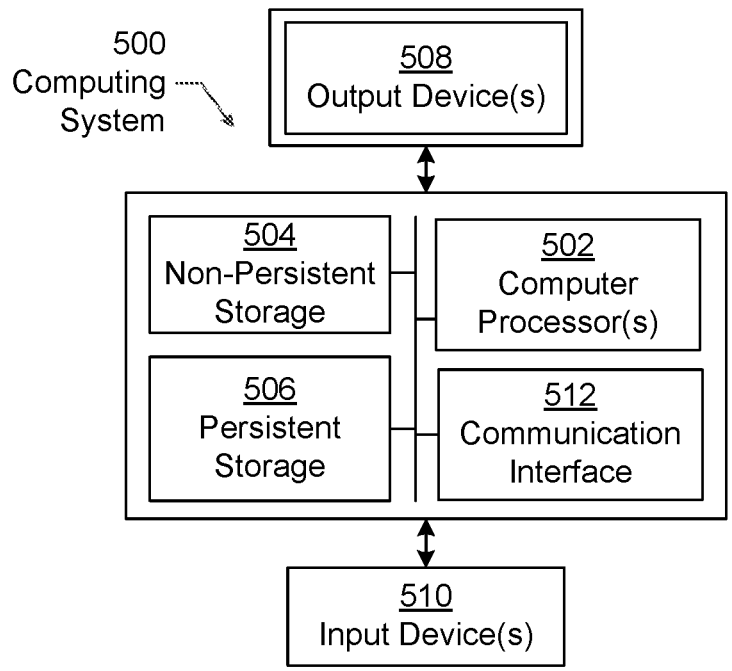
*FIG. 5.1*
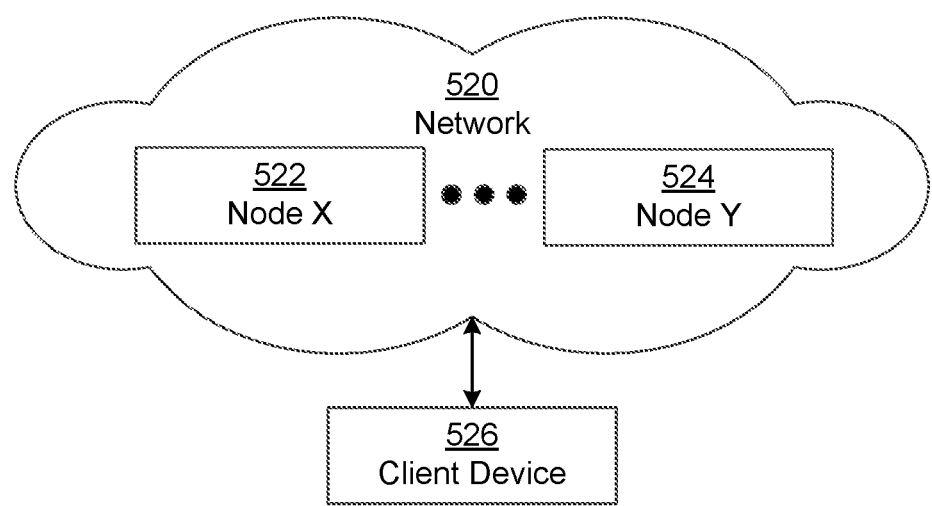
*FIG. 5.2*

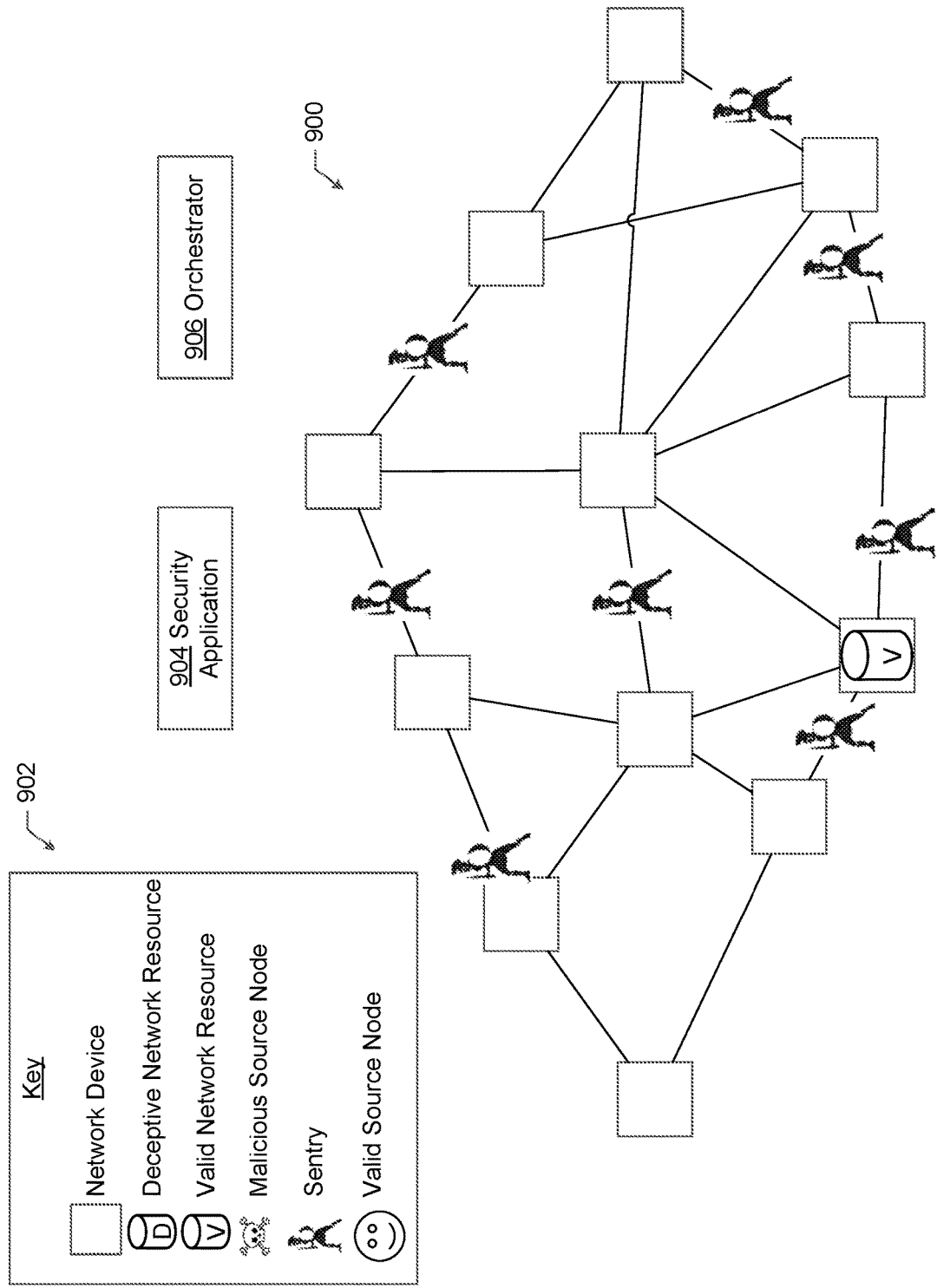
FIG. 9.1

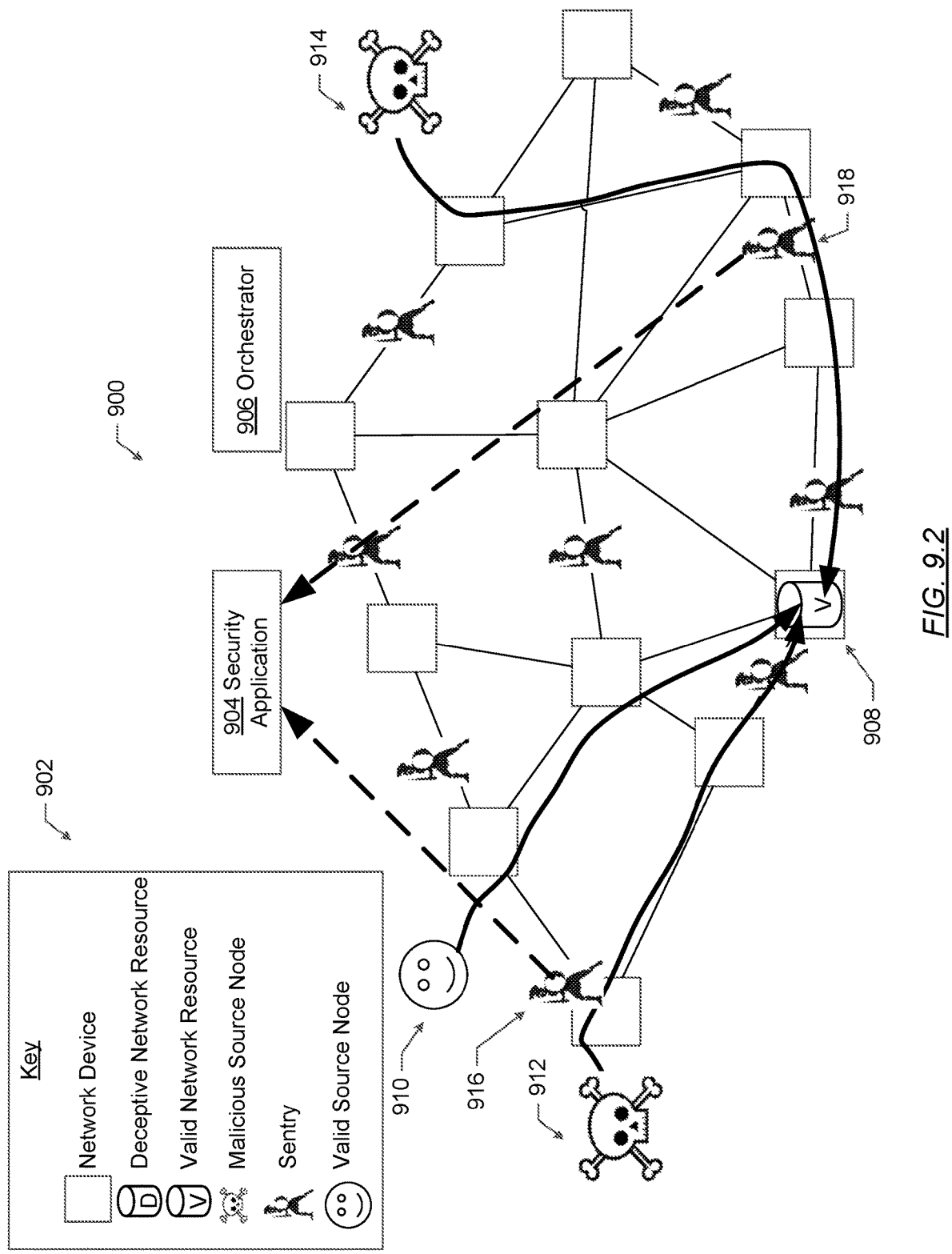
FIG. 9.2

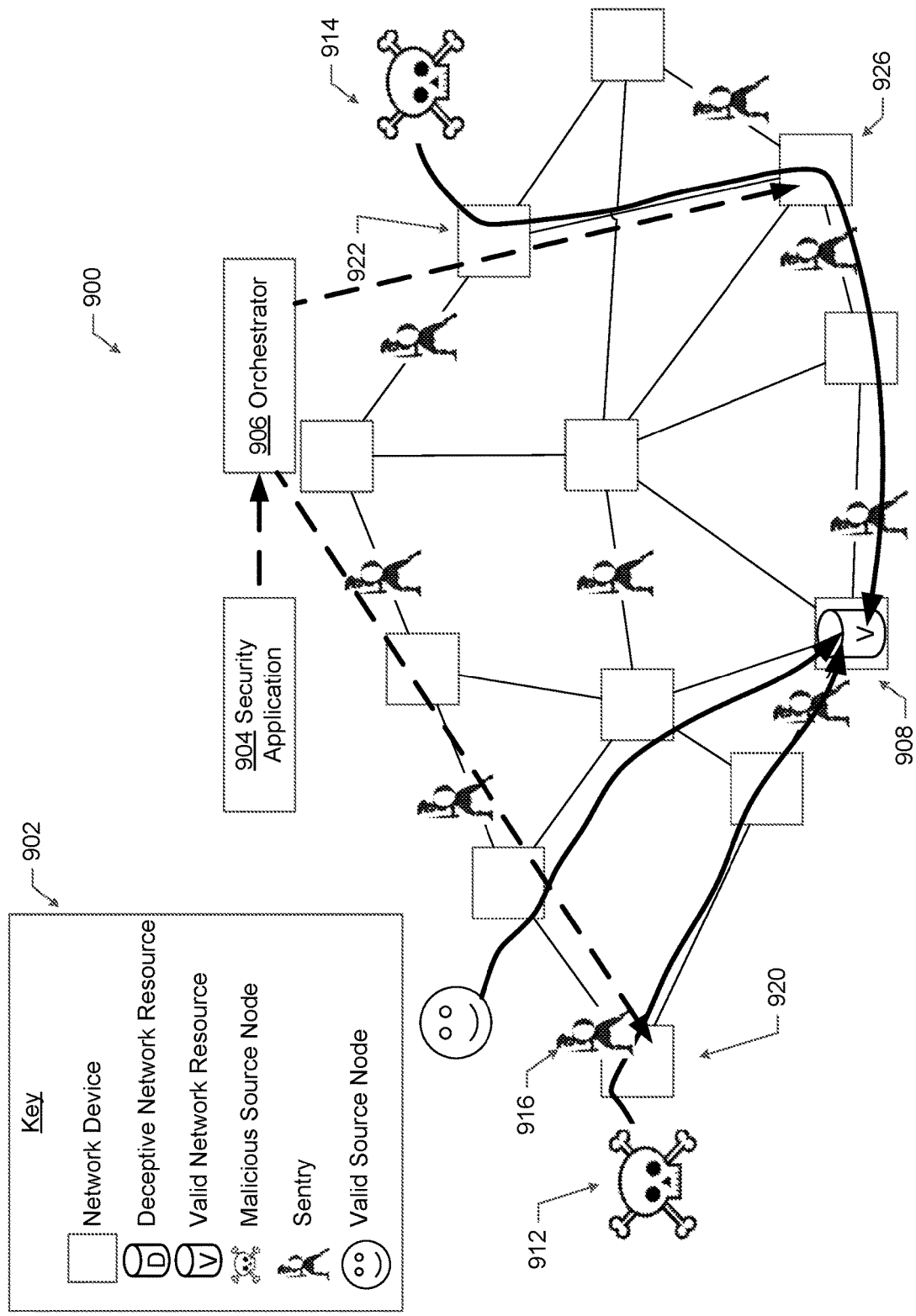
FIG. 9.3

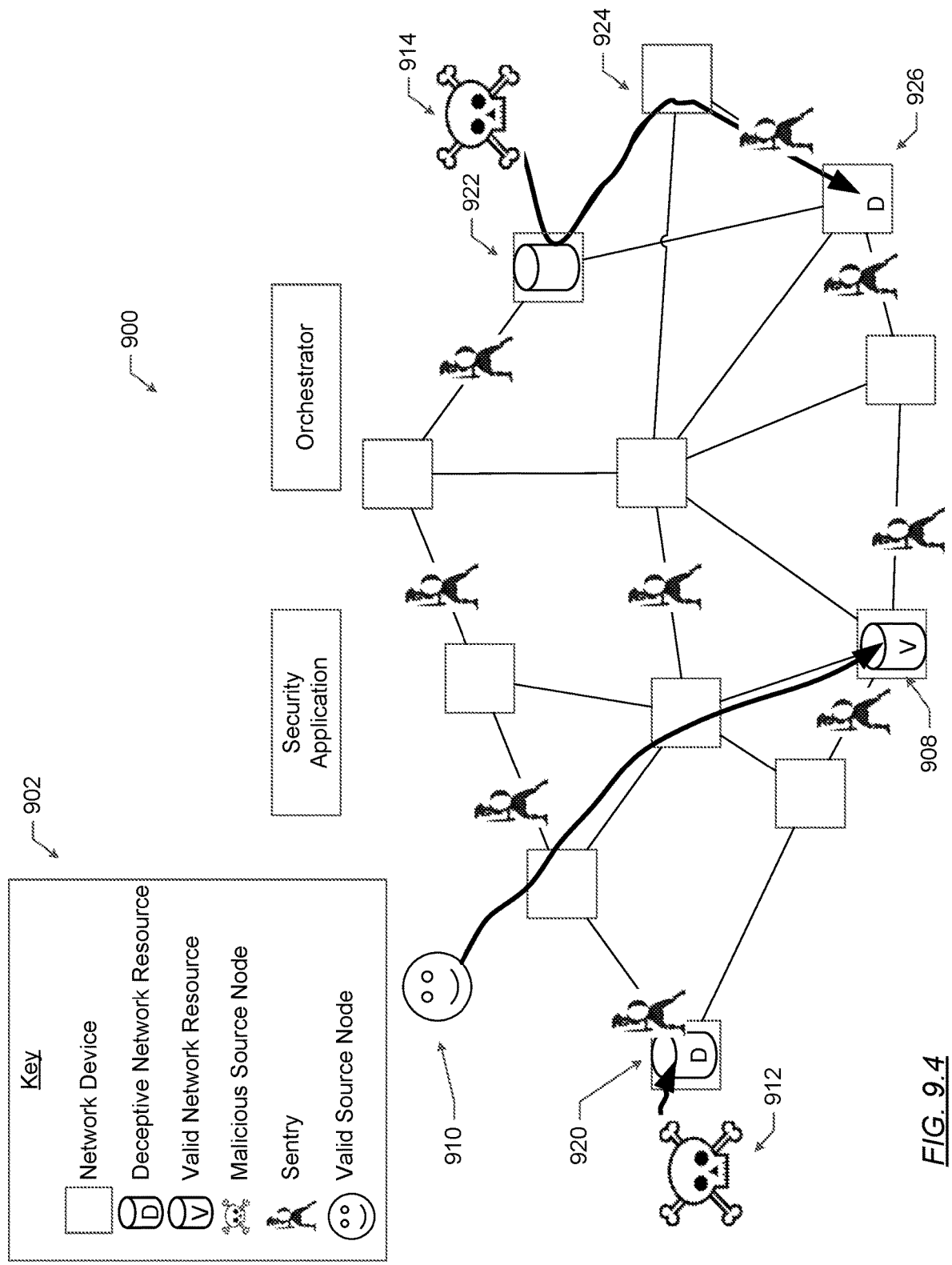
FIG. 9.4

METHOD AND SYSTEM OF MITIGATING NETWORK ATTACKS

BACKGROUND

Computing networks allow various computer systems to communicate. The communication provides a greater degree of functionality to the overall system. For example, a client computing device may receive services from a server computing device. In order to perform the communication, network devices in the network process packets. The processing of packets may render network devices, and, subsequently the network, vulnerable to various malicious attacks.

SUMMARY

In general, in one aspect, one or more embodiments relate to a method for mitigating network attacks. The method includes receiving traffic status information from sentries distributed in a network, and analyzing the traffic status information to detect an attack on the network. In response to the attack, an isolated network slice is created. For the isolated network slice, a deceptive network resource is created in isolated network slice. The method further includes transmitting instructions to route malicious traffic to the deceptive network resource.

In general, in one aspect, one or more embodiments relate to a non-transitory computer readable medium for mitigating network attacks. The non-transitory computer readable medium includes computer readable program code for receiving traffic status information from sentries distributed in a network, and analyzing the traffic status information to detect an attack on the network. In response to the attack, an isolated network slice is created. For the isolated network slice, a deceptive network resource is created in isolated network slice. The computer readable program code is further for transmitting instructions to route malicious traffic to the deceptive network resource.

In general, in one aspect, one or more embodiments relate to a distributed computer system that includes network devices distributed on the network, the network devices are configured to execute sentries configured to monitor traffic on the network and generate traffic status information, and a security application configured to be communicatively coupled to the sentries. The security application is configured to receive traffic status information from sentries distributed in a network, and analyze the traffic status information to detect an attack on the network. In response to the attack, an isolated network slice is created. For the isolated network slice, a deceptive network resource is created in isolated network slice. The security application is further configured to transmit instructions to route malicious traffic to the deceptive network resource.

Other aspects of the invention will be apparent from the following description and the appended claims.

BRIEF DESCRIPTION OF DRAWINGS

FIGS. 1, 2, 3, 4, 5.1, and 5.2 show system diagrams in accordance with one or more embodiments of the invention.

FIGS. 9.1, 9.2, 9.3, and 9.4 show an example in accordance with one or more embodiments of the invention.

DETAILED DESCRIPTION

Figure 1:
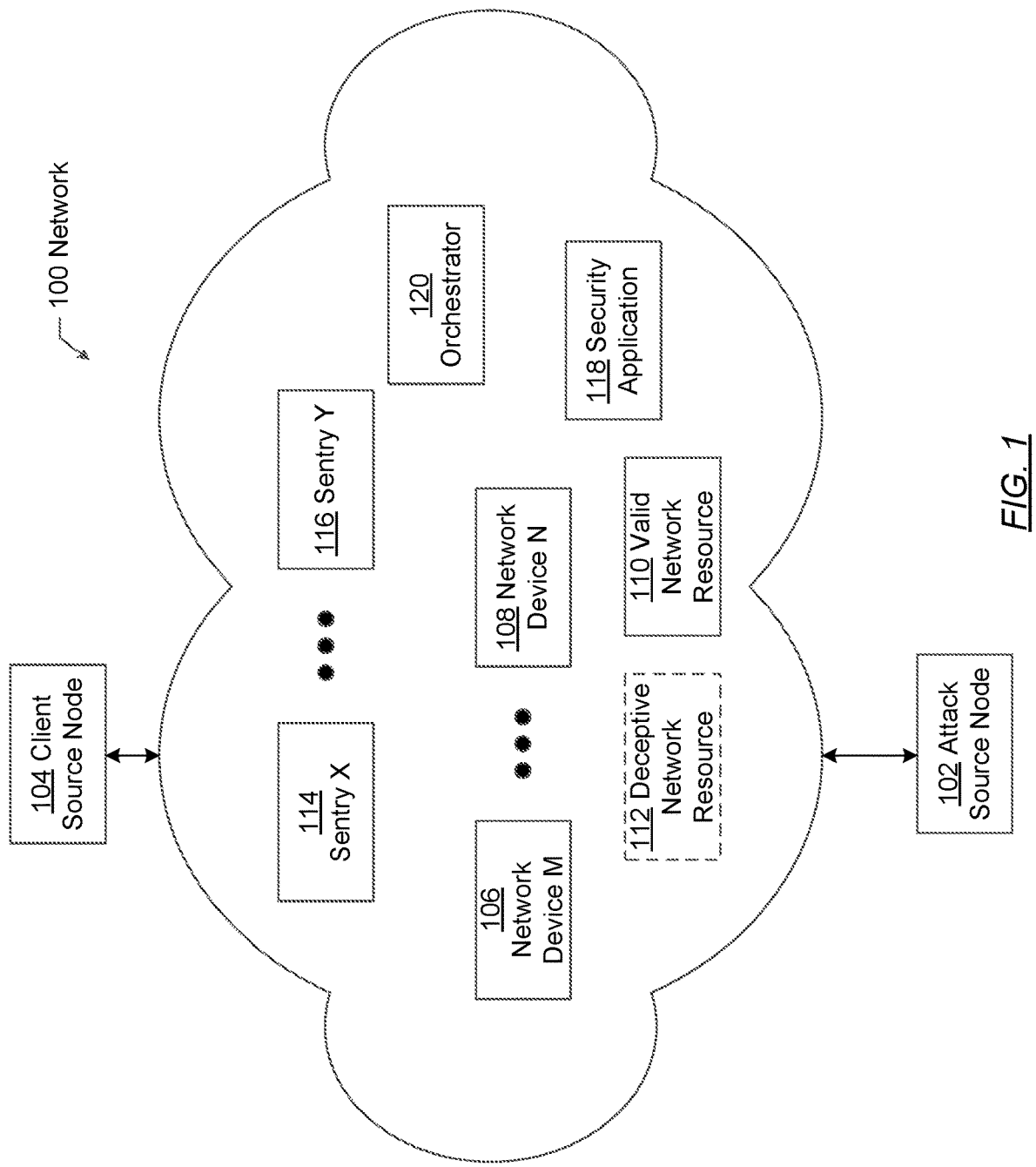

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are used for mitigating network attacks. In particular, one or more embodiments distribute sentries on the network. In one or more embodiments, the sentries detect abnormal and potentially malicious traffic corresponding to a potential attack on a network resource on the network. In one or more embodiments, the sentries send traffic state information to a security application, which detects the potential attack. In response, a deceptive network resource is created, and the malicious traffic is routed to the deceptive network resource.

FIG. 1 shows a diagram of a system in accordance with one or more embodiments of the invention. In FIG. 1, the system includes a network (100) that may be communicatively connected to one or more client source nodes (104) and one or more attack source nodes (102). Two components are communicative connection means that data may be transmitted directly or indirectly from at least one component to the other component. The connection may be temporary, permanent or semi-permanent, and may be through wires or wireless physical components.

In general, a source node (e.g., client source node (104), attack source node (102)) is source of traffic transmitted to the network. For example, the source node may transmit packets to the network. A client source node (104) is a device that transmits valid traffic for services of the network (100). In other words, the traffic from the client source node is intended to reflect actual requests. The attack source node (102) is a source node that initiates malicious traffic on the network. For example, the attack source node (102) may issue packets to the network as at least part of a denial of service (DoS) attack, spoof a client source node, attempt to gain access to a valid client account, and/or perform another attack.

A network (100) is any interconnection of network devices (e.g., network device m (106), network device n (108)) that allows the network devices (e.g., network device m (106), network device n (108)) to communicate with each other. For example, the network may be a local area network (LAN), a virtual local area network (VLAN), a virtual private network (VPN), and other types of networks. The communication may be performed via physical communication links, such as hardware modules on the network devices (e.g., network device m (106), network device n (108)) that implement wired and/or wireless communication. In one or more embodiments of the invention, the network includes physical devices controlled via a software defined network (SDN) architecture. Network functions may be physical and/or virtualized.

The network devices (e.g., network device m (106), network device n (108)) are physical computing systems that are connected via the network. Example network devices and networks are discussed below with respect to FIGS. 5.1 and 5.2.

In one or more embodiments of the invention, one or more of the network devices (e.g., network device m (106), network device n (108)) may include functionality to execute one or more network resources (e.g., valid network resource (110), deceptive network resource (112)). A network resource is an endpoint of a connection that provides data or a service to source nodes. Example network resources may include an application server, a web server, a database, a printer, or any other shared resource that may be used by multiple clients. A valid network resource (110) is a network resource that is presented to client source nodes (104). A deceptive network resource (112) is a network resource that appears to be valid to source nodes, but is designed to deflect attack source nodes away from the valid network resource. In other words, the deceptive network resource is set to deflect, or, in some manner, counteract attempts at unauthorized use of the valid network resource (110). The deceptive network resource may include data that appears to be a legitimate network resource, but does not include confidential or proprietary information. Further, the deceptive network resource may be isolated and monitored so as to identify the source of an attack and provide this information to appropriate authorities.

In one or more embodiments, the network resources (e.g., valid network resource (110), deceptive network resource (112)) execute in a virtual machine (not shown) on the network device. A virtual machine is an isolated execution environment having a dedicated operating system. The network resource may execute within the operating system environment of the operating system in the virtual machine. Further, multiple virtual machines may execute on the same network device. However, within the isolated execution environment, the virtual machine may appear as the entire device. In other words, the operating system and application may be unaware of the existence of other virtual machines on the host device. Rather than or in addition to virtual machines, containers may be used. Containers are isolated environments in which the virtualization layer is above the operating system layer. In other words, a single operating system may have a virtualization software which manages multiple containers.

In one or more embodiments of the invention, sentries (e.g., sentry x (114), sentry y (116)) are hardware, software, and/or firmware that are distributed around the network (100) and include functionality to monitor traffic on the network (100). For example, a network device may execute a sentry by being a sentry or by having code for the sentry execute on a computer processor of the network device. In one or more embodiments of the invention, the sentries are distributed around the periphery of the network (100), such as on edge devices of the network. The sentries (e.g., sentry x (114), sentry y (116)) include functionality to monitor the network traffic and report traffic status information to the security application (118). Monitoring the network traffic may be to monitor the network traffic at layer 0 (e.g., photonic layer), layer 1 (e.g., time division multiplexing layer), layer 2 (e.g., Ethernet, MPLS, etc.), or layer 3 (e.g., Internet protocol layer). At Layer 0, the packet and/or optical switches may provide wavelength connectivity such as via DWDM, ROADMs, etc. At Layer 1, packet and/or optical switches may provide time division multiplexing (TDM) layer connectivity such as via Optical Transport Network (OTN), Synchronous Optical Network (SONET), Synchronous Digital Hierarchy (SDH), etc. At Layer 2, packet and/or optical switches may provide Ethernet or Multi-Protocol Label Switching (MPLS) packet switching. At Layer 3, packet and/or optical switches may provide IP packet forwarding.

Figure 2:
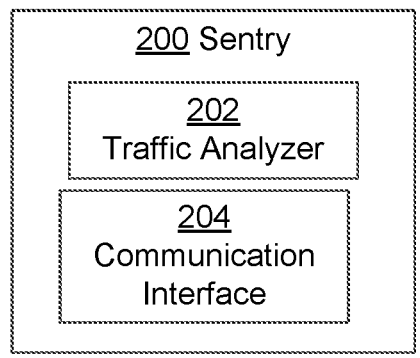

For example, a sentry may monitor the network at the physical link layer, the physical layer, the data link layer, and/or the network layer of the Open Systems Interconnect (OSI) model. A sentry may detect an abnormality with respect to a volume of traffic being transmitted to a particular network resource, a size of a communication, an abnormal source address, or other indication of an attack. The traffic status information may be the abnormal traffic, statistics regarding the amount traffic for each domain or network resource of the system. FIG. 2 shows a diagram of a sentry (200) in accordance with one or more embodiments of the invention. As shown in FIG. 2, a sentry (200) may include a traffic analysis (202) and a communication interface (204). The traffic analyzer (202) includes functionality to analyze traffic and detect an abnormality in the traffic on the network. The communication interface (204) is an interface for communicating with the security application. In some embodiments, such as when the sentry is a virtual machine or a network device, the sentry may act as a deceptive network resource.

Figure 3:
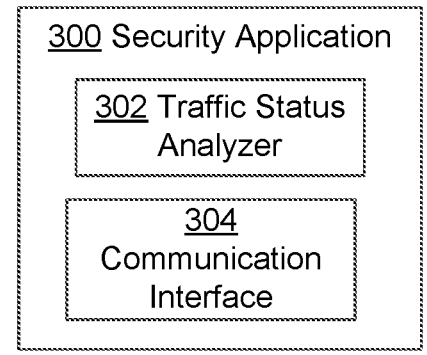

Returning to FIG. 1, the security application (118) is software and/or firmware that includes functionality to detect whether a network attack is occurring, and to manage the mitigation of the network attack. The security application (118) may execute on a network device (e.g., network device m (106), network device n (108)). FIG. 3 shows a diagram of a security application (300) in accordance with one or more embodiments of the invention. As shown in FIG. 3, the security application (300) may include a traffic status analyzer (302) and a communication interface (304). The traffic status analyzer (302) includes functionality to analyze traffic status information and detect an attack. The communication interface (304) is an interface for communicating with the orchestrator (120) and the sentries (114 . . . 116).

Returning to FIG. 1, in one or more embodiments of the invention, the orchestrator (120) is hardware, software, or any combination thereof that includes functionality to monitor network resources and network devices, and to provision virtual machines on the network devices.

Figure 4:
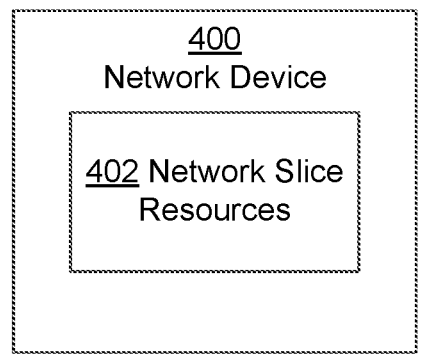

FIG. 4 shows diagram of a network device (400) in accordance with one or more embodiments of the invention. Amongst other components, the network device (400) includes network slice resources (402). The network slice resources are hardware and/or software resources allocated to a network slice, such as physical ports, switches, virtual switches. A network slice is a set of connection resources (e.g., network functions and network device partitions) that are allocated to a particular flow of traffic (e.g., a particular domain). A flow of traffic is a set of traffic following a path through the network and directed to a network resource. Thus, a network slice may span multiple network devices. For example, a network slice may be an optical private network, an Ethernet private Line, an Ethernet virtual local area network, and may have a dedicated path through the network. A path is a set of connections from a source endpoint (e.g. a network element) in which the source node enters the network to a destination endpoint having the network resource. In order to achieve the path, optical layer and/or electrical layer ingress ports and egress ports may be allocated to the network slice, as part of the network slice resources, using an ingress to egress port mapping, such as a physical and logical port mapping. Further, the network slice resources may include a dedicated wavelength for an optical signal that is received by the optical layer ingress ports and transmitted via an optical layer egress port. Network slice resources may include entries in various tables that define bandwidth, connection paths, network functions, and other aspects of the network slice. Although the above are examples of network slices, other types of network slices may exist without departing from scope of the invention.

Embodiments of the invention may be implemented on a computing system. Any combination of mobile, desktop, server, router, switch, embedded device, network element, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions, such as a microprocessor, network processor, field programmable gate array, or other such processing circuit. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the invention.

While FIGS. 1-5.2 show various configurations of components, other configurations may be used without departing from the scope of the invention. For example, various components may be combined to create a single component. As another example, the functionality performed by a single component may be performed by two or more components.

Figure 6:
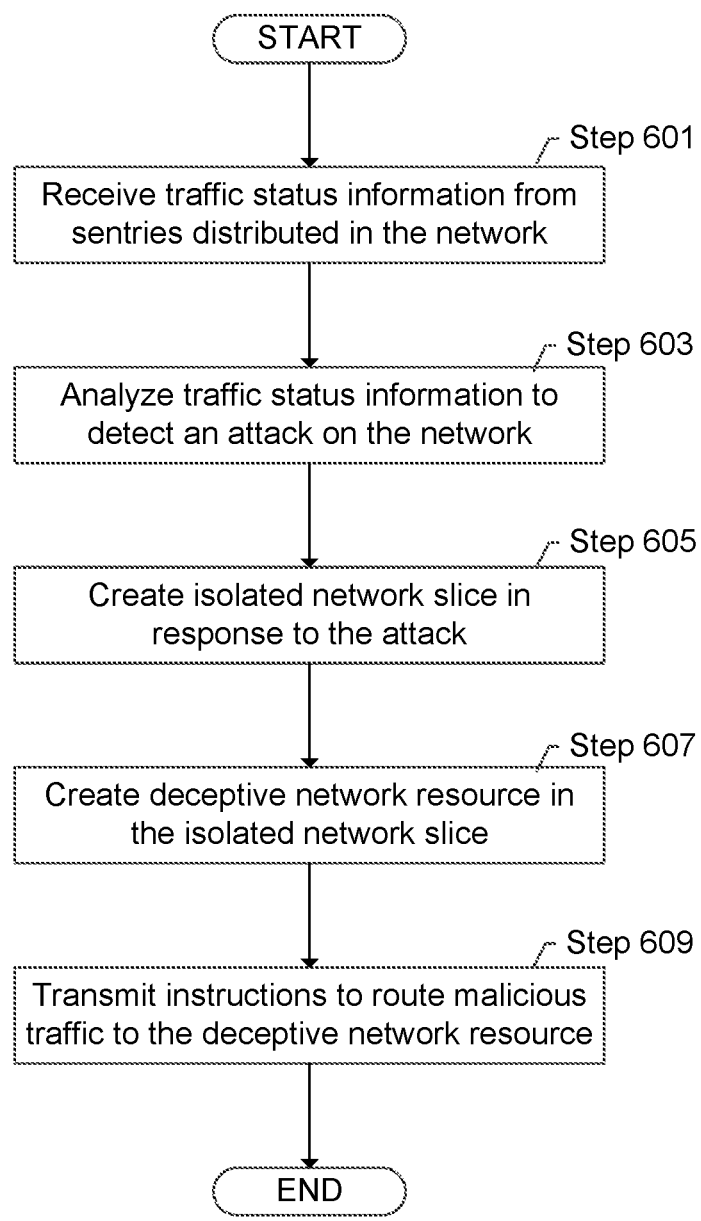
FIGS. 6, 7, and 8 show flowcharts in accordance with one or more embodiments of the invention.
Figure 7:
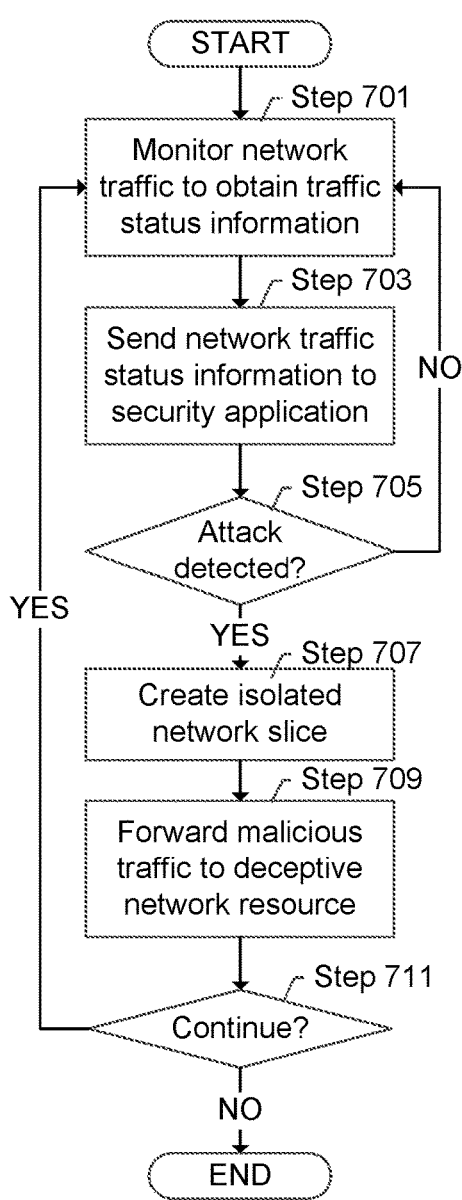
Figure 8:
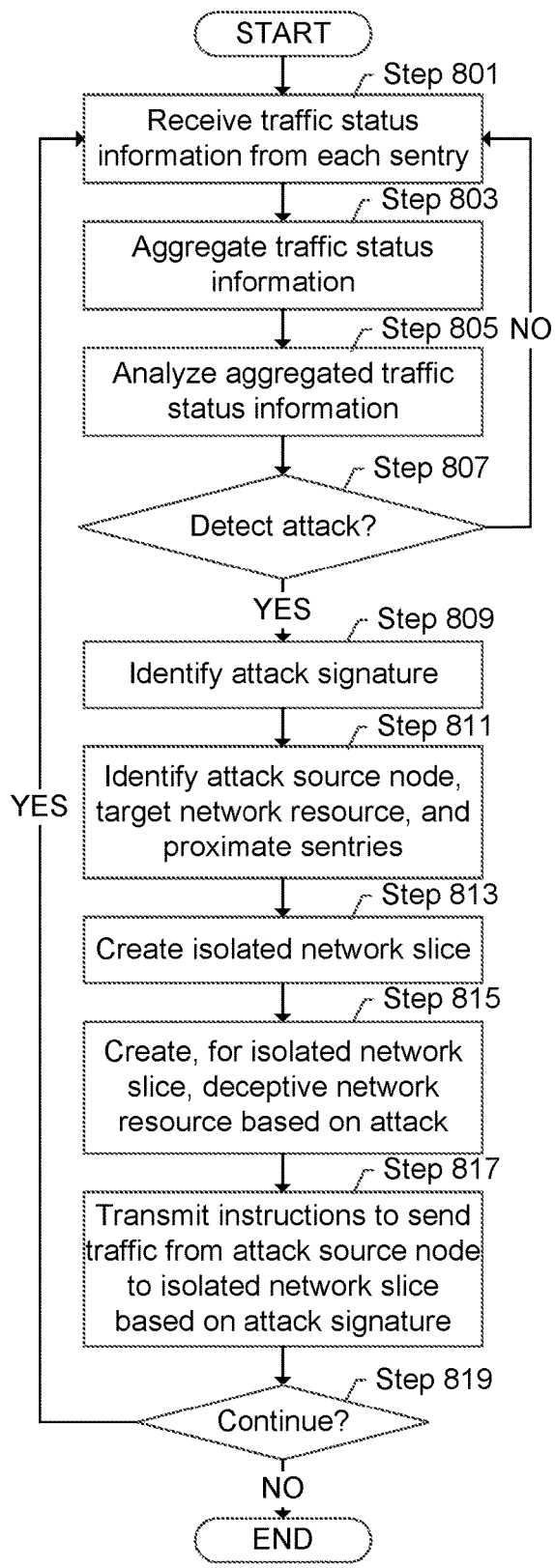

FIGS. 6, 7, and 8 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Further, the various steps of the flowcharts may be performed by the system discussed above with reference to FIGS. 1-5.2.

Turning to FIG. 6, FIG. 6 shows a flowchart for mitigating a network attack in accordance with one or more embodiments of the invention. In Step 601, traffic status information is received from sentries distributed in the network. In one or more embodiments of the invention, as sentries intercept traffic, the sentries may aggregate metadata from the traffic to create the traffic status information. The sentries send the traffic status information using the respective communication interfaces to the security application.

In Step 603, the traffic status information is analyzed to detect an attack on the network in accordance with one or more embodiments of the invention. Analyzing the traffic status information may be based on considering traffic status information from each sentry individually and/or aggregating the traffic status information from multiple sentries and analyzing the aggregate. For example, the security application may use the source internet protocol (IP) address, destination IP address, source port, and transmission protocol to identify a type of traffic, and volume directed to a network resource. In one or more embodiments of the invention, an attack is detected on the network by a security application.

In response to the attack, an isolated network slice is created in Step 605 in accordance with one or more embodiments of the invention. Creating the isolated network slice may include the security application issuing instructions to the orchestrator to create the network slice.

Further, in accordance with one or more embodiments of the invention, a deceptive network resource is created in the isolated network slice in Step 607. For example, the orchestrator may create the deceptive network resource, allocate bandwidth to the deceptive network resource, and otherwise modify the network. By way of a more specific example, the security application with the orchestrator may create an optical private network, an Ethernet private Line, an Ethernet virtual local area network, or other network for the deceptive network resource.

In Step 609, instructions to route malicious traffic to the deceptive network resource are transmitted to the network in accordance with one or more embodiments of the invention. In one or more embodiments, the security application transmits instructions to the sentries to route the malicious traffic to the deceptive network resource. Valid traffic from client source nodes remain routed to the valid network resource. By routing the malicious traffic to the deceptive network resource, the deceptive network resource may be monitored to identify the attacking source node or nodes.

FIG. 7 shows a flowchart for a sentry to mitigate network attacks in accordance with one or more embodiments of the invention. In Step 701, the sentry monitors network traffic to obtain traffic status information. By being distributed on the periphery of the network, sentries may intercept traffic as the traffic flows during the normal routing. For example, sentries located at ends of the network links may analyze traffic as the traffic is transmitted along the corresponding link. Sentries located on network devices may analyze the traffic passing through the network device when a copy of the traffic is transmitted to the sentry. In at least some embodiments, the sentries perform an analysis on the traffic to search for anomalies. For example, the sentries may compare the traffic with baseline utilization levels. To determine the baseline utilization levels, the sentries may analyze usage patterns for each network resource. If the traffic is abnormal (e.g., that amount of traffic is a threshold more than the baseline utilization level), the sentry may detect an anomaly. The sentry may analyze other aspects of the traffic, such as the source IP address, destination IP address, source port, and protocol to determine that an anomaly exists.

In Step 703, network traffic status information is sent to the security application in accordance with one or more embodiments of the invention. When the security application receives the traffic status information, the security application processes the traffic status information and determines whether an attack is present. Data analytics may be used to perform a network-wide correlation analysis of data received from multiple sentries to determine whether an attack is present. The security application may notify the sentry of the attack. For example, an implicit notification (e.g., in the form of instructions for a new network slice) and/or an explicit notification (e.g., with an attack code that directly indicates a presence of an attack) may be sent to the sentry. Accordingly, in Step 705, a determination is made whether an attack is detected. For example, a determination may be made whether the sentry receives the notification of the attack. If notification of an attack is not received, the network traffic may continue to be monitored in Step 701.

If a notification of an attack is received, an isolated network slice is created in Step 707 in accordance with one or more embodiments of the invention. The network components, such as sentries, midpoint, or endpoint network components may receive configuration parameters to route the malicious traffic to the created isolated network slice. For example, the configuration parameters may be provided in the form of an update to one or more tables. Based on the updates, the network devices may be configured or updated to route the traffic. The midpoint may be reprogrammed to (i) participate in a deceptive network slice and (ii) forward malicious data away from the target endpoint to a deceptive endpoint. Thus, the midpoint may move malicious traffic along a different path based on direction from the orchestrator and/or security application.

In Step 709, the malicious traffic is forwarded to the deceptive network resource in accordance with one or more embodiments of the invention. In other words, valid traffic from client source nodes remain being routed to the valid network resource while malicious traffic is rerouted to the deceptive network resource. Thus, to an attack source node, the traffic may appear to be routed to a valid network resource and, thus, may be incentivized to continue the attack while the network is identifying the attacker and gathering information about the attack. Because the deceptive network resource is only created and the network is only modified when an attack is occurring, hardware and software resources for the network slice are not unnecessarily allocated when an attack does not exist.

In Step 711, a determination is made whether to continue monitoring and/or forwarding. For example, the sentries may continually monitor the network for an attack in Step 701.

Although not shown in FIG. 7, the network slice for the deceptive network resource may be terminated once a determination is made that the attack is no longer occurring. By way of another example, the termination may be based on a determination that sufficient metrics about the attack have been gathered. For example, the network slice for the deceptive network resource may be terminated once the attack source node and vulnerabilities of the network exploited by the attack are identified.

FIG. 8 shows a flowchart for a security application to mitigate network attacks in accordance with one or more embodiments of the invention. In Step 801, traffic status information is received from each sentry in accordance with one or more embodiments of the invention. Receiving the traffic status information may be performed as discussed above with reference to Step 601 of FIG. 6.

In Step 803, the traffic status information is aggregated in accordance with one or more embodiments of the invention. In one or more embodiments, the security application may identify commonalities across multiple sentries. The commonalities are associated with each other, such as to create statistics about the network spanning multiple sentries and detect a path of an attack through a network.

In Step 805, the security application analyzes the traffic status information to determine whether an attack is occurring in accordance with one or more embodiments of the invention. In Step 807, a determination is made whether the attack is occurring. For example, an out-of-profile spike in bandwidth may be indicative of an attack. By way of another example, network devices under attack can report issues directly to the security application. For example, the consumption of all the transport control protocol (TCP) session tracking resources of the network device may be indicative of the attack. If an attack is not occurring, the flow may return to Step 801.

In Step 809, if an attack is occurring, then an attack signature is identified. The attack signature is the set of data about the attack that distinguishes valid traffic on the network from malicious traffic. For example, the attack signature may be a particular IP address, a particular protocol, or another attribute of the malicious traffic.

In Step 811, the attack source node, the target network resource, and proximate sentries are identified in accordance with one or more embodiments of the invention. For example, the security application may attempt to determine the edge device in which the malicious traffic is received. Further, the target of the attack may be identified directly from the packets in the attack. In at least some embodiments, the security application may identify a path of the attack through the network based on the sentries reporting the anomalies. The sentries that are proximate may be the sentries that reported an anomaly and are closest to the edge device from which the attack is obtained. Although the above is discussed with reference to a single attack source node and a single edge device, multiple attack source nodes and edge devices may be identified.

In Step 813, an isolated network slice is created in accordance with one or more embodiments of the invention. Further, a deceptive network resource is created based on the attack in Step 815 in accordance with one or more embodiments of the invention. Instructions are transmitted to the network to send traffic from the attack source node to the isolated network device based on the attack signature. For example, the security application may send a notification to the orchestrator and a network controller to change the network. The sentries may also serve as the platform to support virtual machines (VMs) that are replications of resources under attack. For example, the VMs that can replicate the resources under attack without the confidential data may be created. Thus, the deceptive network resource may be used to shunt traffic away from the real resource.

By way of another example, replicated containers may be used instead of complete VMs. The VM or container is assigned to a network slice, such as by creating a network slice for the VM or container. For example, the network slice may be configured with the same Layer 2 and Layer 3 characteristics of the valid network resource being attacked. Thus, the media access control (MAC) address for Layer 2 and the IP address for Layer 3 from the valid network resource is replicated for the deceptive network resource. The replication may be performed by copying the entire VM and its state.

The security application, with the orchestrator and controller, may isolate the attacker, and the deceptive network resource onto a network slice. The network slice can be at Layer 1 in the form of an Optical Virtual Private Network (OVPN.) The network slice can also be at Layer 2, for example in the form of Ethernet Virtual Circuits (EVCs) defined as MEF services such as E-Line, E-LAN or E-Tree. Other Layer 2 slicing techniques may include Virtual Private Local Area Network (LAN) Service (VPLS) for a network using Internet Protocol (IP) and Multi-Protocol Label Switching (MPLS), Multi-Protocol Label Switching-Transport Profile (MPLS-TP), or virtualized network overlay methods such as Virtual Extensible LAN (VXLAN). Layer 3 isolation can be achieved by dynamically provisioning a Layer 3 IP//MPLS Virtual Private Network (VPN) or using Layer 3 tunneling methods such as Generic Routing Encapsulation (GRE) or Layer 2 Tunneling Protocol (L2TP) as well as Internet Protocol version 6 (IPv6). Additionally, a network slice may be customized using Software Defined Networking (SDN) techniques, for example, using an SDN protocol such as OpenFlow, to configure the customized network slice.

In some embodiments, rather than creating a network slice spanning multiple network devices, the deceptive network resource is created on a sentry that detected the attack. The sentry may be configured to route the malicious traffic directly to the deceptive network resource. For example, specific routes pointing to the deceptive network resource may be injected into the routing table on the sentry by the security application.

In Step 819, a determination is made whether to continue processing. If a determination is made to continue, the flow returns to Step 801. Otherwise, the flow may return to end.

Although not shown in FIG. 8, the valid attacked resource may be migrated to a different network device. The change may include changing the IP address of the valid network resource and updating the domain name server (DNS) accordingly.

The following example is for explanatory purposes only and not intended to limit the scope of the invention. FIGS. 9.1, 9.2, 9.3, and 9.4 show an example of mitigating a network attack in accordance with one or more embodiments of the invention. FIG. 9 shows an example of a network (900) in accordance with one or more embodiments of the invention. As denoted by key (902), the boxes are network devices, v represents a valid network resource, the sentries are represented by figures with swords in accordance with one or more embodiments of the invention. Lines between the various elements are connections on the network. The security application (904) and orchestrator (906) are shown as being above the network because the security application (904) and orchestrator (906) may have a view of the entire network, may be on virtually any network device or set of network device or external control system (e.g. SDN controller).

FIG. 9.2 shows an example of network traffic to the valid network resource (908) in accordance with one or more embodiments of the invention. In the example, valid traffic is received from client source node (910) and attack traffic is received from attack source nodes (912, 914). Sentries (916, 918) detect the abnormality and transmit traffic status information with the abnormality to security application (904). In response, the security application (904) analyzes the network traffic.

As shown in FIG. 9.3, the security application (904) notifies the orchestrator to instantiate virtual machines for deceptive network resources on network devices (920, 926). In particular, network device (920) may be selected based on being proximate to sentry (916) and being an edge device of the network for the attack from attack source node (912). Network device (926) may be selected after analyzing the path of the attack and determining that network device (922) is an edge device from which the malicious attack of attack source node (914) is received.

Thus, as shown in FIG. 9.4, the network (900) is modified in response to the attack. Malicious traffic from attack source node (912) and from attack source node (914) are routed to deceptive network resources on network device (920) and network device (926), respectively.

In order to route the malicious traffic, the security application identifies a subset of the network to be classified as a new network slice. In the example shown in FIG. 9.4, the network slice includes at least the attack source network device (922) and a chosen deceptive network resource on network device (926) to act as the deceptive destination. The network slice may also include one or more midpoint network resources (924) connected to the attack source node (914) and the chosen deceptive network resource (926).

The security application and/or software defined network (SDN) control system may specifically define the physical or virtual interfaces, switches and links that participate in the network slice. The security application and/or software defined network (SDN) control system may also explicitly or implicitly define the routing path (e.g., from the source node (922), to midpoint network device (924), to deceptive network resource (926)) that attack traffic must follow to reach the deceptive network resource with the network slice. The security application may transmit the information to an orchestrator or an SDN control system, which configures the network slice.

The orchestrator populates forwarding information to the network resources located within the network slice. The forwarding information acts to aid in the identification of attack packets and direct only the attack traffic towards the deceptive network resource.

When the network resources receive packets, the network resources monitor incoming packet characteristics, such as overhead address fields, (for example, using deep packet inspection techniques) to determine if a packet has been classified as legitimate or malicious. If the packet is identified as malicious traffic, the packet is forwarded to the deceptive network resource within the network slice. If the packet is identified as legitimate, the packet is forwarded as normal towards a valid network resource.

To forward attack packets towards the deceptive network resource, the packet may be modified at a source network device (i.e., the edge device) (922) by encapsulating the packet within a tunnel. In one case, a label is added to the attack packet. The label may be used to define the network slice and the constrained paths through the normal network. At the destination deceptive network resource (926), the label is removed prior to entering the deceptive network resource (926). In the example, the label may be a packet (e.g. MPLS label or Ethernet VLAN), TDM (e.g. SONET or OTN time slot) or WDM (e.g. Wavelength) format resulting in a packet, TDM or wavelength network slice, respectively.

Client source node (910) may continue to use valid network resource (908) unimpeded by the malicious traffic. As shown in the example, one or more embodiments may modify the network on an as needed basis to mitigate the effects of malicious traffic.

The computing system or group of computing systems described in FIGS. 1, 2, 3, 4, 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mitigating network attacks, the method comprising:
   receiving traffic status information from a plurality of hardware sentries distributed in a network;
   analyzing, by an orchestrator, the traffic status information from a first hardware sentry among the plurality of hardware sentries to detect an attack source node on the network, wherein the attack source node is proximate the first hardware sentry and corresponds to a source of malicious traffic that is transmitted into the network and toward a target network resource in the network;
   creating, by the orchestrator, an isolated network slice of the network in response to detection of the malicious traffic, wherein the isolated network slice includes any of physical ports, switches, and virtual switches spanning a plurality of network devices and associated links in the network;
   creating, by the orchestrator and for the isolated network slice, a deceptive network resource proximate the first hardware sentry and in the isolated network slice, wherein the deceptive network resource is an endpoint of a first path through the isolated network slice and from the attack source node, and wherein the endpoint is a network node dynamically placed in a different location from the target network resource; and
   transmitting, by the orchestrator, instructions to a plurality of network components to reroute the malicious traffic along the first path in the isolated network slice to the deceptive network resource and away from the target network resource.

2. The method of claim 1, further comprising:
   identifying a first location of a second hardware sentry in a second path of an attack on the network, the second hardware sentry being in the plurality of hardware sentries,
   selecting a network device proximate to the first location;
   wherein creating the deceptive network resource is on the network device.

3. The method of claim 2, further comprising:
   identifying a second location of a third hardware sentry in the second path of the attack, the third hardware sentry being in the plurality of hardware sentries,
   wherein the network device proximate to the first location is selected based on the second hardware sentry being closer than the third hardware sentry to an entry point of the attack into the network.

4. The method of claim 1, wherein analyzing the traffic status information comprises:
   detecting the attack source node based on a combination of network traffic intercepted by at least two hardware sentries of the plurality of hardware sentries.

5. The method of claim 1, wherein creating the deceptive network resource comprises:
   creating a virtual machine for the deceptive network resource; and
   instantiating the deceptive network resource in the virtual machine.

6. The method of claim 1, wherein creating the deceptive network resource comprises:
   creating a container for the deceptive network resource; and
   instantiating the deceptive network resource in the container.

7. The method of claim 1, wherein the isolated network slice utilizes any of Optical Virtual Private Network (OVPN), Ethernet Virtual Circuits (EVCs), Virtual Private Local Area Network (LAN) Service (VPLS), Multi-Protocol Label Switching-Transport Profile (MPLS-TP), Virtual Extensible LAN (VXLAN), Virtual Private Network (VPN), Generic Routing Encapsulation (GRE), and Layer 2 Tunneling Protocol (L2TP).

8. A non-transitory computer readable medium for mitigating network attacks, the non-transitory computer readable medium comprising computer readable program code for:
   receiving traffic status information from a plurality of sentries distributed in a network;
   analyzing the traffic status information to detect an attack source node on the network, wherein the attack source node is proximate a first sentry among the plurality of sentries and corresponds to a source of malicious traffic that is transmitted into the network and toward a target network resource in the network;
   creating an isolated network slice of the network in response to detection of the malicious traffic, wherein the isolated network slice includes any of physical ports, switches, and virtual switches spanning a plurality of network devices and associated links in the network;
   creating, for the isolated network slice, a deceptive network resource proximate the first sentry and in the isolated network slice, wherein the deceptive network resource is an endpoint of a first path through the isolated network slice and from the attack source node, and wherein the endpoint is a network node dynamically placed in a different location from the target network resource; and transmitting instructions to a plurality of network components to reroute the malicious traffic along the first path in the isolated network slice to the deceptive network resource and away from the target network resource.

9. The non-transitory computer readable medium of claim 8, further comprising computer readable program code for:
identifying a first location of a second sentry in a second path of an attack on the network, the second sentry being in the plurality of sentries,
selecting a network device proximate to the first location;
wherein creating the deceptive network resource is on the network device.

10. The non-transitory computer readable medium of claim 9, further comprising computer readable program code for:
identifying a second location of a third sentry in the second path of the attack, the second third sentry being in the plurality of sentries,
wherein the network device proximate to the first location is selected based on the third sentry being closer than the third sentry to an entry point of the attack into the network.

11. The non-transitory computer readable medium of claim 8, wherein analyzing the traffic status information comprises:
detecting the attack source node based on a combination of network traffic intercepted by at least two sentries of the plurality of sentries.

12. The non-transitory computer readable medium of claim 8, wherein creating the deceptive network resource comprises:
creating a virtual machine for the deceptive network resource; and
instantiating the deceptive network resource in the virtual machine.

13. The non-transitory computer readable medium of claim 8, wherein creating the deceptive network resource comprises:
creating a container for the deceptive network resource; and
instantiating the deceptive network resource in the container.

14. The non-transitory computer readable medium of claim 8, wherein creating the isolated network slice comprises creating an optical private network.

15. A distributed computer system comprising:
a plurality of network devices distributed on the network, the plurality of network devices configured to execute
a plurality of sentries configured to monitor traffic on the network and generate traffic status information; and
a security application configured to be communicatively coupled to the plurality of sentries and configured to
receive traffic status information from a plurality of sentries distributed in a network,
analyze the traffic status information from a first sentry among the plurality of sentries to detect an attack source node on the network, wherein the attack source node is proximate the first sentry and corresponds to a source of malicious traffic that is transmitted into the network and toward a target network resource in the network,
create an isolated network slice of the network in response to detection of the malicious traffic, wherein the isolated network slice includes any of physical ports, switches, and virtual switches spanning a plurality of network devices and associated links in the network,
create, for the isolated network slice, a deceptive network resource proximate the first sentry and in the isolated network slice, wherein the deceptive network resource is an endpoint of a first path through the isolated network slice and from the attack source node, and wherein the endpoint is a network node dynamically placed in a different location from the target network resource, and
transmit instructions to a plurality of network components to reroute the malicious traffic along the first path in the isolated network slice to the deceptive network resource and away from the target network resource.

16. The distributed computer system of claim 15, wherein the plurality of network devices are further configured to execute:
an orchestrator configured to be communicatively coupled to the security application and configured to:
issue instructions to instantiate the deceptive network resource on a network device of the plurality of network devices.

17. The distributed computer system of claim 15, wherein the plurality of network devices comprises a first network device configured to execute a second sentry, wherein the security application is further configured to:
identify the first network device based on the second sentry being in a second path of an attack on the network,
selecting a second network device proximate to the first network device;
wherein creating the deceptive network resource is on the second network device.

18. The distributed computer system of claim 17, wherein the plurality of network devices comprises a third network device configured to execute a second third sentry, wherein the security application is further configured to:
identify the second network device based on the third sentry being in the second path of the attack,
wherein the second network device is selected based on the second sentry being closer than the second third sentry to an entry point of the attack into the network.

19. The distributed computer system of claim 15, wherein analyzing the traffic status information comprises:
detecting the attack source node based on a combination of network traffic intercepted by at least two sentries of the plurality of sentries.

20. The distributed computer system of claim 15, wherein creating the isolated network slice comprises creating at least one selected from a group consisting of an optical private network, an Ethernet private Line, and Ethernet virtual local area network.

* * * * *